(12) United States Patent
Müller et al.

(10) Patent No.: US 9,541,372 B2
(45) Date of Patent: Jan. 10, 2017

(54) EDDY CURRENT-BASED ANGLE SENSOR

(71) Applicant: Continental Teves AG & Co. oHG, Frankfurt (DE)

(72) Inventors: Hilmar Müller, Heuchelheim (DE); Sören Lehmann, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 170 days.

(21) Appl. No.: 14/355,254

(22) PCT Filed: Nov. 2, 2012

(86) PCT No.: PCT/EP2012/071740
§ 371 (c)(1),
(2) Date: Apr. 30, 2014

(87) PCT Pub. No.: WO2013/064646
PCT Pub. Date: May 10, 2013

(65) Prior Publication Data
US 2014/0288796 A1 Sep. 25, 2014

(30) Foreign Application Priority Data
Nov. 3, 2011 (DE) .......................... 10 2011 085 737

(51) Int. Cl.
*G01B 7/30* (2006.01)
*G05G 15/04* (2006.01)
*G01D 5/20* (2006.01)

(52) U.S. Cl.
CPC ............... *G01B 7/30* (2013.01); *G01D 5/2006* (2013.01); *G05G 15/04* (2013.01)

(58) Field of Classification Search
CPC .. G01D 5/2006; G01D 5/2013; G01D 5/2033; G01D 5/204; G01D 5/2046; G01D 5/22; G01D 5/2216; G01D 5/2241; G01D 5/14; G01D 5/20; G01D 5/202; G01D 5/2053; G01D 5/2225; G01D 5/2258; G01D 5/2275; G01B 7/30; G01B 7/00; G01L 3/105
(Continued)

(56) References Cited

U.S. PATENT DOCUMENTS 3,641,467 A * 2/1972 Ringland ............... H02K 29/12
    318/661
4,307,366 A * 12/1981 Fujita ................... G01D 5/2258
    336/136
(Continued)

FOREIGN PATENT DOCUMENTS

CN     1417555 A   *   5/2003
DE     31 41 015       6/1982
(Continued)

OTHER PUBLICATIONS

Insulation Materials, Nov. 21, 2012, Allied Wire and Cable, https://web.archive.org/web/20121121111719/http://www.awcwire.com/Insulation-Materials.aspx.*
(Continued)

*Primary Examiner* — Thomas G Black
*Assistant Examiner* — Sara Lewandroski
(74) *Attorney, Agent, or Firm* — RatnerPrestia

(57) ABSTRACT

The invention relates to an inductive angle sensor that includes a measuring element able to be positioned, within an angle measurement range, in different angle-positions about a rotational axis, as well as a coil that is at a distance from said measuring element. The surface of the measuring element is at a different distance from the coil in each angle-position, within said angle measurement range.

10 Claims, 5 Drawing Sheets

(58) Field of Classification Search
USPC .... 701/70, 36; 702/151; 324/207.15–207.19; 336/130–136, 336/115–129; 74/512–514
See application file for complete search history.

(56) References Cited

U.S. PATENT DOCUMENTS

| | | | | |
|---|---|---|---|---|
| 4,604,575 | A * | 8/1986 | Shimizu | G01D 5/243 318/653 |
| 4,752,732 | A * | 6/1988 | Van Schoiack | G01D 5/243 324/207.18 |
| 4,875,008 | A * | 10/1989 | Lorenzen | G01D 5/147 324/207.21 |
| 5,210,491 | A * | 5/1993 | Hachtel | G01D 5/2053 324/207.12 |
| 5,349,293 | A * | 9/1994 | Tanaka | G01B 7/30 324/207.16 |
| 5,506,502 | A * | 4/1996 | Maennle | G01D 5/2216 324/207.16 |
| 6,288,536 | B1 | 9/2001 | Mandl et al. | |
| 7,417,421 | B2 * | 8/2008 | Wendt | G01D 5/145 324/207.21 |
| 7,932,715 | B2 * | 4/2011 | Howard | G01D 5/2026 324/207.17 |
| 8,988,069 | B2 * | 3/2015 | Erickson | G01D 5/2013 324/207.25 |
| 2003/0173952 | A1 * | 9/2003 | Niwa | G01D 3/036 324/207.16 |
| 2004/0025622 | A1 * | 2/2004 | Slanec | B60T 7/042 74/512 |
| 2005/0184726 | A1 * | 8/2005 | Watanabe | G01D 5/202 324/207.11 |
| 2005/0225320 | A1 * | 10/2005 | Lee | G01D 5/2053 324/207.17 |
| 2005/0273295 | A1 | 12/2005 | Ito | |
| 2006/0113989 | A1 * | 6/2006 | Nicolosi | G01D 5/147 324/207.2 |
| 2006/0144166 | A1 | 7/2006 | Ruehl et al. | |
| 2008/0007251 | A1 * | 1/2008 | Lee | B62D 6/10 324/207.17 |
| 2008/0054887 | A1 * | 3/2008 | Lee | G01D 5/2053 324/207.17 |
| 2008/0164886 | A1 * | 7/2008 | Feucht | G01D 5/2013 324/654 |
| 2008/0174302 | A1 * | 7/2008 | Lee | G01D 5/2046 324/207.16 |
| 2009/0039874 | A1 * | 2/2009 | Kreit | G01D 5/2073 324/207.17 |
| 2009/0174396 | A1 * | 7/2009 | Howard | G01D 5/2046 324/207.24 |
| 2010/0001718 | A1 * | 1/2010 | Howard | G01B 7/003 324/207.15 |
| 2010/0033064 | A1 * | 2/2010 | Tanaka | G01B 7/30 310/67 R |
| 2010/0175497 | A1 * | 7/2010 | Nozu | B60K 26/021 74/514 |
| 2011/0167920 | A1 | 7/2011 | Rink et al. | |
| 2011/0260718 | A1 * | 10/2011 | Hirning | G01D 11/16 324/207.25 |
| 2012/0146629 | A1 * | 6/2012 | Mulcaster | G01D 5/145 324/207.25 |

FOREIGN PATENT DOCUMENTS

| | | |
|---|---|---|
| DE | 692 03 886 | 1/1996 |
| DE | 196 31 438 | 2/1998 |
| DE | 10 2004 033 083 | 1/2006 |
| DE | 10 2004 056 049 | 6/2006 |
| DE | 60 2005 000 909 | 12/2007 |
| DE | 10 2009 033 242 | 1/2010 |
| EP | 0 530 090 | 3/1993 |
| NL | 8 201 178 | 10/1983 |

OTHER PUBLICATIONS

Misron et al., "Effect of Inductive Coil Shape on Sensing Performance of Linear Displacement Sensor Using Thin Inductive Coil and Pattern Guide," 2011, Sensors.*
AWC, "Insulation Materials," Nov. 21, 2012, Allied Wire and Cable, https://web.arcbive.org/web/20121121111719/http://www.awcwire.com/Insulation-Materials.aspx.*
International Search Report corresponding to application No. PCT/EP2012/071740, dated Jan. 18, 2013.
German Search Report corresponding to application No. DE 10 2011 085 737.0, dated Oct. 23, 2013.

* cited by examiner

EDDY CURRENT-BASED ANGLE SENSOR

CROSS REFERENCE TO RELATED APPLICATION

This application is the U.S. National Phase Application of PCT International Application No. PCT/EP2012/071740, filed Nov. 2, 2012, which claims priority to German Patent Application No. 10 2011 085 737.0, filed Nov. 3, 2011, the contents of such applications being incorporated by reference herein.

FIELD OF THE INVENTION

The present invention relates to an inductive angle sensor comprising a measuring body, which can be positioned about an axis of rotation inside an angle measuring range in different angular positions, and a coil that is at a distance from the measuring body wherein the surface of the measuring body is at a different distance from the coil in each angular position within the angle measuring range and a signal transmitter for a motor vehicle comprising a control element, which rotates a shaft, and an inductive angle sensor for ascertaining the angular position of the control element.

BACKGROUND OF THE INVENTION

Eddy current sensors can be used, as is known for example from DE 196 31 438 A1, which is incorporated by reference, to determine the distance between a measuring body and a coil.

Inductive angle sensors that use eddy current sensors are known by way of example from DE 10 2004 033 083 A1, which is incorporated by reference. The eddy current sensor comprises a coil for generating eddy currents in a conductive measuring body and the measuring body itself. The coil and the measuring body can move relative to one another in a movement direction. The measuring body comprises a conductive track that is designed in such a manner that the inductance of the coil changes continuously, that is to say periodically, as the track is scanned in the movement direction. It is possible in this manner to perform time-continuous incremental angle measurements.

Moreover, it is known from DE 10 2009 033 242 A1, which is incorporated by reference, to ascertain an angle of rotation index using eddy current sensors.

SUMMARY OF THE INVENTION

An aspect of the invention provides an improved angle sensor.

An aspect of the invention proposes that the surface of the measuring body that is facing the coil is to be embodied in such a manner that the distance between the surface of the measuring body and the coil changes continuously within an angle range that is to be measured as the measuring body is rotated in a predetermined direction. The surface of the measuring body that is facing the track comprises a pathway that is laid on the surface of the measuring body and comprises the shortest distance between the measuring body and the coil in each angular position of the measuring body within the angle range that is to be measured (Euclidian distance).

An aspect of the invention is based on the knowledge that for the eddy current measuring principle it is not the measuring body per se that is moved toward a coil in order to change the electromagnetic characteristics of the space around the coil. It is already possible, by means of changing the position of the measuring body with respect to the coil, to bring about changes in the electromagnetic characteristics of the space if said space is embodied differently in the respective different positions of the measuring body.

On this basis, an aspect of the invention is based on the idea of using the eddy current principle for providing an absolute value encoder for the purpose of measuring angles. This is achieved by virtue of the fact that the surface of the measuring body is at a different distance from the coil in each angular position within the angle measuring range so that each angular position can be allocated a unique distance between the coil and the measuring body surface. In this manner, it is possible with the aid of a circuit for the purpose of evaluating the distance using measuring technology to ascertain unambiguously each angular position of the measuring body and consequently of a device under test that is connected to the measuring body, such as for example the gas pedal of a vehicle.

An aspect of the invention therefore proposes an inductive angle sensor that comprises a measuring body, which can be positioned about an axis of rotation inside an angle measuring range in different angular positions, and a coil that is at a distance from the measuring body. In accordance with the invention, the surface of the measuring body is at a different distance from the coil in each angular position within the angle measuring range.

An aspect of the invention renders it possible to use the eddy current principle for the purpose of ascertaining the absolute angle of a device under test. Eddy current sensors of this type are cost-effective, precise and durable.

In one development of the invention, the distance that is between the surface of the measuring body and the coil and is monotonically dependent upon the angular position in the angle measuring range. Consequently, the distance between the surface of the measuring body and the coil increases or rather reduces continuously if the measuring body is rotated in the angle measuring range constantly in a specific direction. As a consequence, the ascertained distance can be evaluated in a particularly simple manner.

In an additional or alternative development of the invention, the coil is positioned at a distance from the measuring body in an axial manner when viewed from the axis of rotation. By virtue of axially positioning the coil, it is possible to design the surface of the measuring body in accordance with the invention in a particularly simple manner, in that said surface is simply chamfered by way of example on an end face.

In a further development of the invention, the coil is positioned at a distance from the measuring body in a radial manner when viewed from the axis of rotation. The radial positioning of the coil has the advantage that the mainly greater axial tolerances or clearances during the process of ascertaining an angle of rotation of the measuring body can be completely eradicated.

In an additional further development of the invention, the angle sensor comprises an additional coil, said coil being is positioned at a distance from the measuring body in an axial manner when viewed from the axis of rotation if the first coil is positioned at a distance from the measuring body in a radial manner, or said coil being positioned at a distance from the measuring body in a radial manner when viewed from the axis of rotation if the first coil is positioned at a distance from the measuring body in an axial manner. The additional coil renders it possible to create redundancy which can be used to achieve plausibility of the measuring results of the first coil in order by way of example to establish whether the first coil is still arranged correctly inside the angle sensor.

In a still further development of the invention, the measuring body can be produced from a material that has electrically conductive and/or ferromagnetic characteristics. When using materials that have electrically conductive characteristics, such as for example aluminum or copper, the inductance of the coil changes as a result of eddy currents. When using materials that have ferromagnetic characteristics, such as for example soft iron, the inductance of the coil changes as a result of the change in its magnetic characteristics.

In a further development of the invention, the coil is a planar coil. The planar coil renders it possible to further reduce the size of the angle sensor since the planar coil can be placed by way of example in a planar manner on a housing wall of the angle sensor without having to protrude into the inner chamber of this housing and taking up space.

In an additional development of the invention, the planar coil is formed from conductor tracks of a circuit that is electrically connected to the planar coil for the purpose of ascertaining the inductance and for the purpose of outputting a signal that is dependent upon the inductance of the planar coil. In this manner, the planar coil can be attached directly to the circuit merely by virtue of forming the conductor tracks. In this manner, an extra coil for the angle sensor is omitted, which further reduces the size of the angle sensor. In addition, production costs and material costs can be reduced since it is neither necessary to provide an extra coil nor is it necessary to attach an extra coil to the circuit during an extra production step.

In a further development of the invention, insulation is arranged between the coil and the measuring body. This insulation prevents the elements of the angle sensor from short circuiting and consequently prevents undefined measuring conditions.

An aspect of the invention also proposes a signal transmitter for a motor vehicle and said signal transmitter comprises a control element, which rotates a shaft, and an inductive angle sensor in accordance with the invention for the purpose of ascertaining the angular position of the control element.

In a particular embodiment of the invention, the control element is an accelerator pedal.

BRIEF DESCRIPTION OF THE DRAWINGS

The above described characteristics, features and advantages of this invention and the manner in which these are achieved can be more easily and clearer understood in conjunction with the following description of the exemplary embodiments that are described in detail with reference to the drawings, wherein.

DETAILED DESCRIPTION OF THE PREFERRED EMBODIMENT

Figure 1:
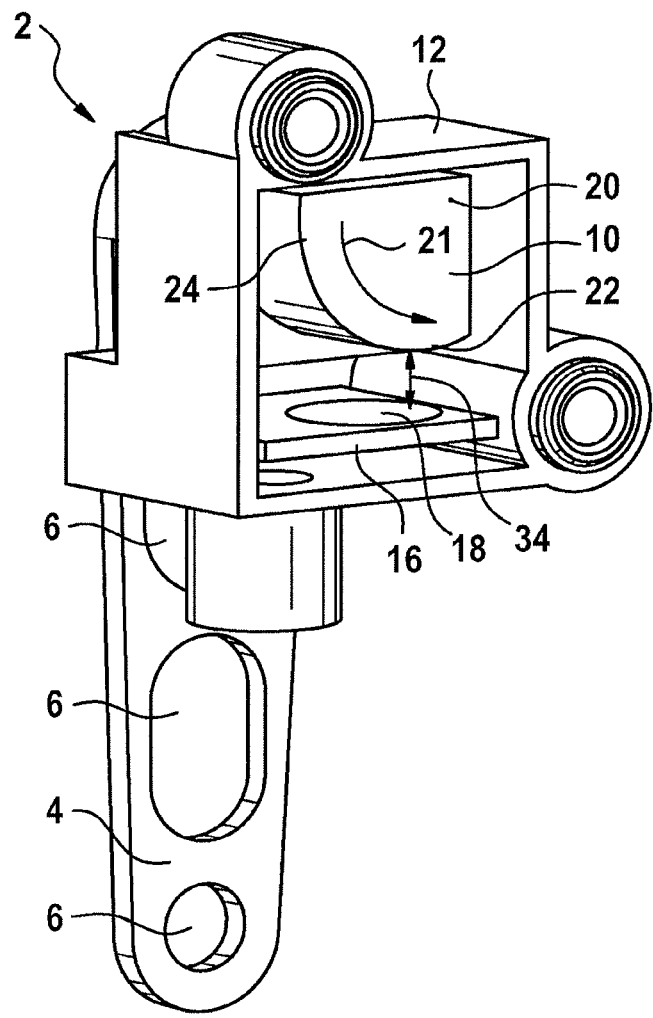
FIG. 1 illustrates a perspective view of a first exemplary embodiment for an angle sensor in accordance with the invention.
Figure 2:
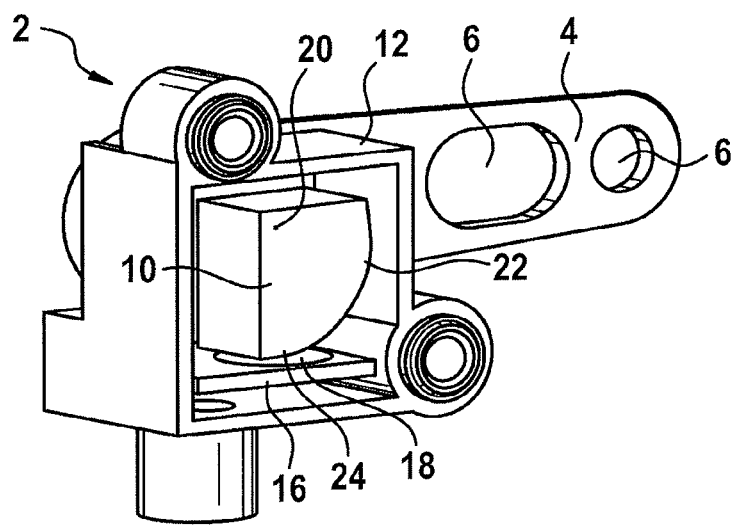
FIG. 2 illustrates a perspective view of the first exemplary embodiment for the angle sensor in accordance with the invention.
Figure 3:
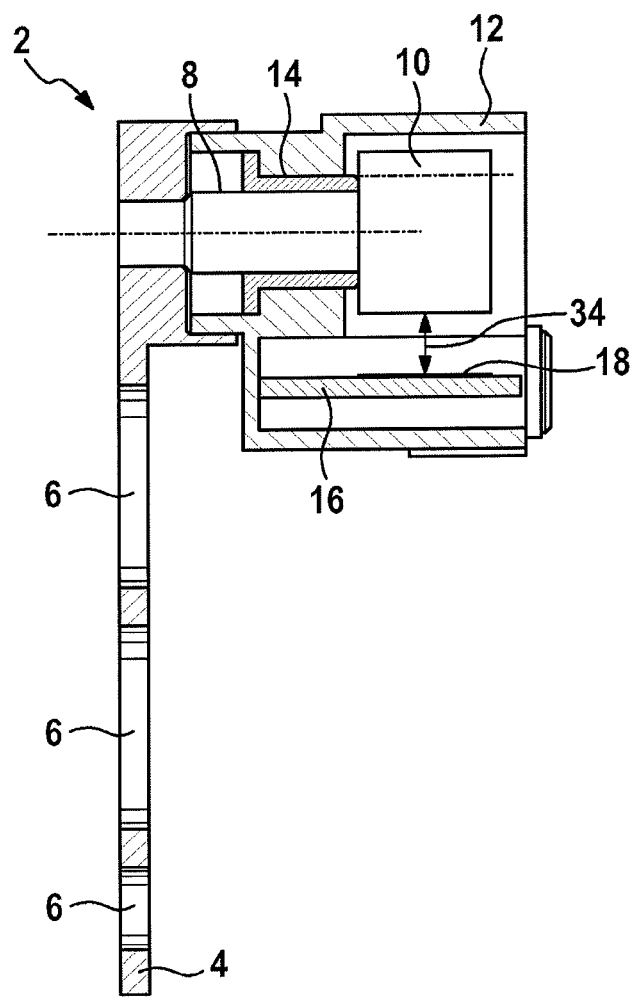
FIG. 3 illustrates a sectional view of the first exemplary embodiment for the angle sensor in accordance with the invention.

Reference is made to FIGS. 1 to 3 that illustrate a first exemplary embodiment for an angle sensor 2 in accordance with an aspect of the invention.

The angle sensor 2 comprises a lever 4 that comprises apertures 6 and is mounted in such a manner as to be able to pivot about a shaft 8. A measuring body 10 that will be further described hereinunder is arranged in a housing 12 on the face of the shaft 8 that is lying opposite the lever 4. The shaft penetrates the housing 12 in a bearing 14. When viewed in the plane of the drawing, a circuit board 16 is embodied in a radially displaced manner below the measuring body 10 on the lower face of the housing 12 and said circuit board supports a planar coil 18.

The measuring body 10 has the shape of a quartered ellipse, wherein the shaft 8 engages substantially at the center point 20 of the ellipse. If the shaft 8 is rotated about the center point 20 in the direction 21 illustrated in FIG. 1, then the minor semi-axis 22 of the ellipse is rotated upwards in the direction 21 when viewed in the plane of the drawing and the major semi-axis 24 is rotated downwards when viewed in the plane of the drawing. Since the major semi-axis 24 in a manner known per se comprises a greater radial distance from the center point of the ellipse than the minor semi-axis 22, a rotational movement in the direction 21 causes the surface of the measuring body 10 to be moved towards the planar coil 18 that is arranged below the measuring body 10.

The elliptical shape of the measuring body 10 is selected only as an example. In accordance with aspects of the invention, any form is suitable that moves the surface of the measuring body 10 towards the planar coil 18 in dependence upon the angle of rotation of the lever 4 and consequently of the measuring body 10.

Figure 5:
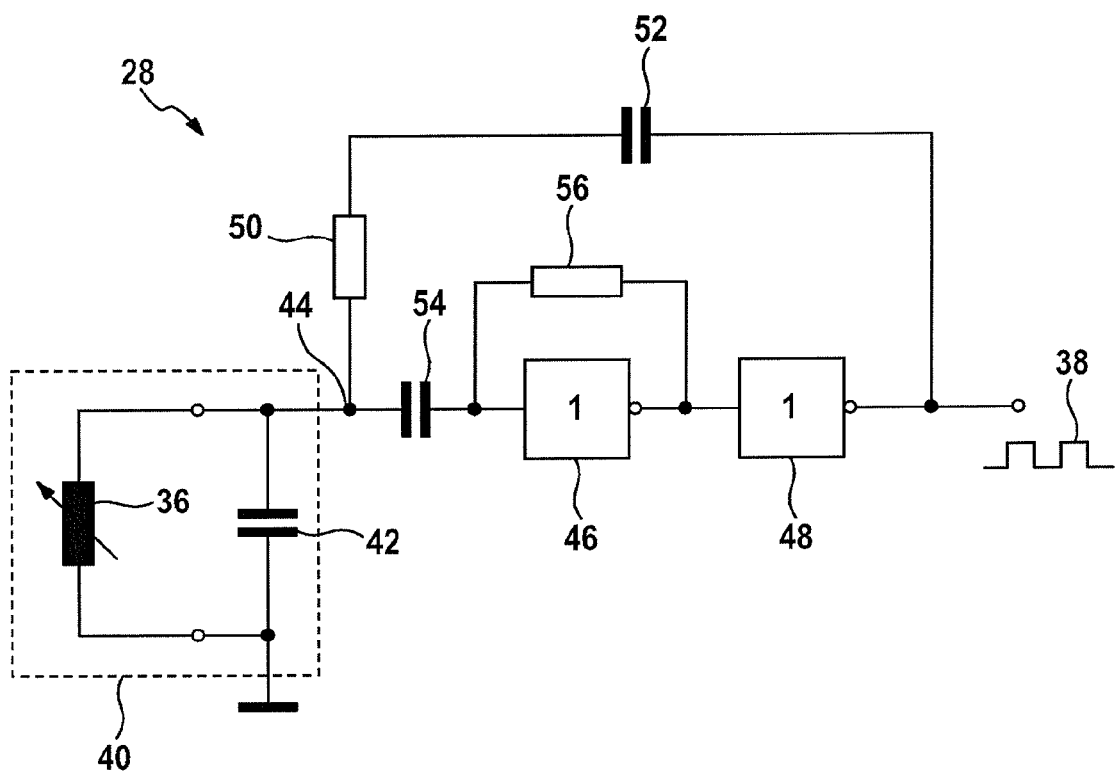
FIG. 5 illustrates an exemplary circuit for evaluating the measurement results of the inductive angle sensor in accordance with the invention.

The planar coil 18 is formed from multiple conductor tracks on the circuit board 16 that comprises a circuit 28 that is illustrated by way of example in FIG. 5 and is provided for the purpose of evaluating the inductance of the planar coil 18.

Figure 4:
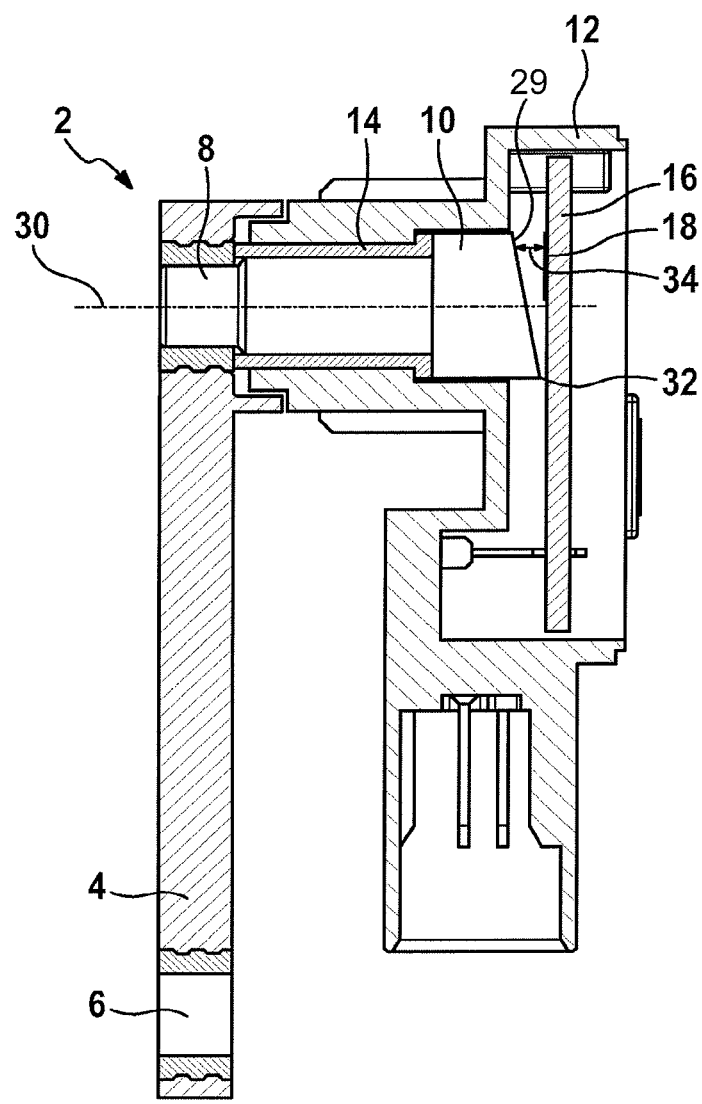
FIG. 4 illustrates a sectional view of a second exemplary embodiment for the angle sensor in accordance with the invention.

Reference is made to FIG. 4 that illustrates a second exemplary embodiment for an angle sensor 2 in accordance with the invention. Like elements that appear in FIG. 4 are provided with like reference numerals as the like elements that are illustrated in FIGS. 1 to 3 and a description of like elements is not repeated.

In FIG. 4, the axial end face 29 of the measuring body 10, said axial end face lying opposite the shaft 8, is chamfered with respect to the axis of rotation 30 of the shaft 8. The planar coil 18 is arranged on the circuit board 16 in an axial manner adjacent to the axial end face 28 of the measuring body 10 at the radial upper face of the shaft 8 when viewed from the axis of rotation 30 and viewed in the plane of the drawing. By virtue of rotating the lever 4 and consequently the measuring body 10, an edge 32 on the axial end face 28 of the measuring body when viewed from the axis of rotation 30 and viewed in the plane of the drawing is rotated to form the radial upper face of the shaft 8 so that as in the case of the first exemplary embodiment of FIGS. 1 to 3 the surface of the measuring body 10 is moved towards the planar coil 18.

By virtue of moving the surface of the measuring body 10 towards the planar coil 18, a distance 34 between the planar coil 18 and the surface of the measuring body 10 is reduced. This distance 34 can be increased if the measuring body is rotated in the opposite direction to the direction 21 illustrated in FIG. 1. The inductance 36 of the planar coil 18 changes in dependence upon the distance 34. The inductance 36 can be ascertained and evaluated using the circuits 28.

Reference is made to FIG. 5 that illustrates an exemplary circuit diagram of the circuit 28.

In the present embodiment, the circuit 28 is embodied as an LC gate oscillator. On the basis of the inductance 36 of the planar coil 18, said LC gate oscillator generates an output signal 38 with a frequency that is dependent upon the inductance 36 by way of a parallel resonant circuit 40. As an alternative, the inductance could be determined using other oscillators, for example a Meissner oscillator, or by using other measuring principles, such as for example by ascertaining the impedance of the planar coil 18.

The parallel resonant circuit 40 in the illustrated circuit 28 is formed from the inductance 36 of the planar coil 18 and a capacitor 42. The amplification of the oscillation 44 that is generated by the parallel resonant circuit 40 is achieved by way of a first inverter 46 and a second inverter 48, said amplification being necessary for an oscillator. The necessary feedback to the parallel resonant circuit 40 is performed by way of a feedback resistor 50 and a feedback capacitor 52. The feedback resistor 50 determines the amplitude of the output signal 38 and thus the power consumption of the circuit 28. A filter capacitor 54 between the parallel resonant circuit 40 and the first inverter 46 filters signal components with low frequencies, such as for example an offset. Moreover, the first inverter 46 forms a subordinate feedback loop together with a further feedback resistor 56.

The invention claimed is:

1. An inductive angle sensor comprising a measuring body, which can be positioned about an axis of rotation inside an angle measuring range in different angular positions, and a coil that is at an axial distance from the measuring body along the axis of rotation, wherein the surface of the measuring body is at a different axial distance from the coil in each angular position within the angle measuring range,
wherein the coil is electrically connected in parallel with a capacitor to form an oscillator.

2. The inductive angle sensor as claimed in claim 1, wherein the distance that is between the surface of the measuring body and the coil is monotonically dependent upon the angular position in the angle measuring range.

3. The inductive angle sensor as claimed in claim 1, further comprising:
an amplifying circuit connected to an output of the oscillator for amplifying an output of the oscillator; and
a feedback circuit coupled between an output of the amplifying circuit and the output of the oscillator.

4. The inductive angle sensor as claimed in claim 1, comprising an additional coil that is positioned at a distance from the measuring body in an axial or radial manner when viewed accordingly from the axis of rotation.

5. The inductive angle sensor as claimed in claim 1, wherein the measuring body is at least one of electrically conductive and ferromagnetic.

6. The inductive angle sensor as claimed in claim 1, wherein the coil is a planar coil.

7. The inductive angle sensor as claimed in claim 6, wherein the planar coil is formed from conductor tracks of a circuit that is electrically connected to the planar coil for the purpose of ascertaining the inductance and for the purpose of outputting a signal that is dependent upon the inductance of the planar coil.

8. The inductive angle sensor as claimed in claim 1, comprising insulation between the coil and the measuring body.

9. A signal transmitter for a motor vehicle comprising a control element, which rotates a shaft, and an inductive angle sensor as claimed in claim 1 for ascertaining the angular position of the control element.

10. The signal transmitter as claimed in claim 9, wherein the control element is a drive pedal.

* * * * *